United States Patent [19]

Koide

[11] Patent Number: 4,555,780
[45] Date of Patent: Nov. 26, 1985

[54] OPTICAL RECORDING AND PLAYBACK UNIT

[75] Inventor: Hiroshi Koide, Kanagawa, Japan

[73] Assignee: Ricoh Co. Ltd., Japan

[21] Appl. No.: 442,244

[22] Filed: Nov. 17, 1982

[30] Foreign Application Priority Data

Nov. 19, 1981 [JP] Japan .............................. 56-186053
Dec. 11, 1981 [JP] Japan .............................. 56-199735

[51] Int. Cl.$^4$ .............................................. G11B 7/12
[52] U.S. Cl. ........................................ 369/43; 369/45; 369/44; 250/201
[58] Field of Search .................................... 369/43–46; 350/252, 255; 250/201, 201 DF

[56] References Cited

U.S. PATENT DOCUMENTS 4,386,823  6/1983  Musha .............................. 369/44 X
4,408,313 10/1983  Musha .............................. 369/44 X
4,462,096  7/1984  Kusaka .............................. 369/45

Primary Examiner—Robert L. Richardson
Attorney, Agent, or Firm—Guy W. Shoup

[57] ABSTRACT

A bobbin which supports at least optical lens includes a portion on which two or three coils are disposed. Each of the coils disposed on the bobbin portion is wound thereon at a given finite angle with respect to the center axis of the bobbin, at least one such angle being non-perpendicular to the central axis, and the coils form together a composite coil assembly. A magnetic circuit includes a gap and defines a magnetic flux in the region of the gap which passes through the composite coil assembly in a direction substantially perpendicular to the center axis of the bobbin. Support means support the bobbin within the gap of the magnetic circuit so it is freely movable. By controlling the current passed through each coil, the location of the bobbin is adjusted, thus adjusting the position of the optical lens with respect to a disc.

8 Claims, 17 Drawing Figures 4,555,780

OPTICAL RECORDING AND PLAYBACK UNIT

BACKGROUND OF THE INVENTION

This invention relates to a unit which effects optical recording and playback into or from a disc-shaped medium having a series of tracks or spaced tracks, in particular, to an optical recording and playback unit which performs both focus control to maintain a beam of light in focus on a pitted surface where vertical oscillation of a disk may occur during rotation of a disc-shaped medium, and a tracking control which causes the beam to follow the radial displacement of a track which may occur as a result of eccentricity in the rotation of the disc shaped medium, thus allowing the beam to be maintained in tracking relationship with a single track, and more particularly, to an optical recording and playback unit which achieves time axis control to maintain the tracking speed of the beam constant in addition to both of the abovementioned controls.

Known recording and playback apparatus perform both focus control and tracking control by utilizing a lens barrel including a light source and a lens system and which is supported by a resilient support. With this known apparatus, drive along the direction of the optical axis and in a direction transverse thereto has been achieved using separate, namely, two or three linear motors of the moving coil type. The provision of two or three motors, accompanied by an increased length in the optical path of the optical system which results from the individual location of the two or three motors in the direction of the optical axis, also tends to result in an increased size and a complex arrangement of the apparatus.

SUMMARY OF THE INVENTION

It is an object of the invention to provide an optical recording and playback unit which has a reduced size along the direction of the optical axis and simple construction while capable of performing both focus control and a tracking control.

It is another object of the invention to provide an optical recording and playback unit which has reduced size along the direction of the optical axis and which is simple in construction while being capable of performing time axis control in addition to a focus control and tracking control.

To achieve these objects, an optical recording and playback unit according to the invention comprises an optical lens, a bobbin which supports at least the optical lens and having a portion on which coils are disposed, a composite coil assembly, a magnetic circuit, and means for supporting the bobbin.

The composite coil assembly comprises two or three coils depending on the number of variables being controlled. Specifically, if only focus control and tracking control are desired, the composite coil assembly comprises two coils. However, the assembly comprises three coils if time axis control is to be performed in addition to both of the abovementioned controls.

Each of the two or three coils is disposed on the bobbin portion with an individual finite angle of inclination with respect to the center axis of the bobbin. It should be understood that the bobbin is formed of a non-magnetic material.

The magnetic circuit includes a gap, in which the bobbin is supported by support means so it can move freely therein. In the region of the gap, the magnetic circuit creates a magnetic flux, which is oriented to pass through the composite coil assembly in a direction substantially perpendicular to the center axis of the bobbin.

Where both focus and tracking control are intended, the composite coil assembly comprises two coils. Preferably, a first coil receives a signal which is proportional to the sum of a focus error signal representing deviation of focus of the light beam on the pitted surface of the disc and a tracking error signal indicative of deviation of the light beam from a given track, while a difference signal proportional to the above two signals is applied to a second coil.

If time axis control is to be performed, in addition to both of the above controls, the composite coil assembly comprises three coils, including a first, a second and a third coil. A focus error signal representing deviation of focus of the light beam on the pitted surface of the disc, a tracking error signal indicative of deviation of the light beam from a given track, and a time axis error signal indicative of fluctuation in the tracking speed of the beam along the track are preferably first generated in a mathematical manner, and are then preferably applied to the first, the second and the third coil, respectively.

As described, according to the invention, the composite coil assembly is formed on the bobbin which supports at least the optical lens, and the individual coils are supplied with given currents which correspond to individual error signals, thereby enabling an optical recording and playback unit which has reduced size along the direction of the optical axis and which is convenient to use.

BRIEF DESCRIPTION OF THE DRAWINGS

FIG. 1 illustrates one embodiment of the invention;

FIG. 6 is an illustration of a second embodiment of the invention,

DESCRIPTION OF THE PREFERRED EMBODIMENTS

Figure 1A:
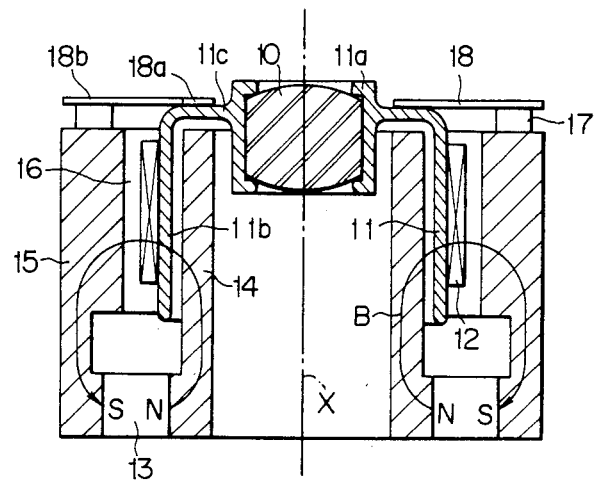
FIG. 1(a) being a schematic illustration in cross section.
Figure 1B:
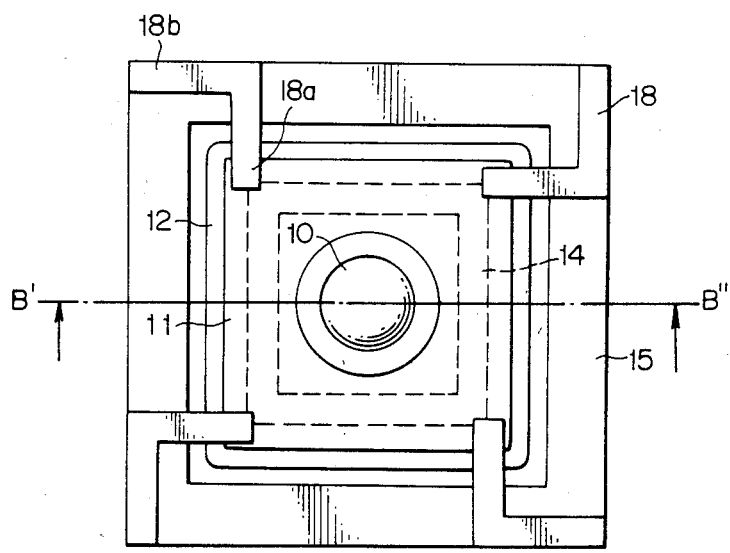
FIG. 1(b) a schematic top view.

FIG. 1 shows diagrammatically an optical recording and playback unit according to a first embodiment of the invention. For the convenience of description, only the playback operation will be described, but it should be understood that the same applies to a recording operation which requires control of the recording spot of light. FIG. 1(a) is a longitudinal section taken along the line B'—B" in FIG. 1(b), which represents a schematic plan view. In this embodiment, an optical lens 10 is utilized to focus a reading light beam onto an information pit formed in a disc, and to perform tracking of the information track. The optical lens 10 is supported by a support section 11a of a bobbin 11. In addition to the support section 11a formed at one end thereof, the bobbin 11 includes a pipe-shaped section 11b which is concentric with section 11a and carries a composite coil assembly 12 including a pair of coils thereon. The manner of winding the coils in the assembly 12 will be described later, but it should be mentioned here that according to the invention, it is only necessary that the composite coil assembly 12 be disposed on the bobbin section 11b without requiring any other coil, thus providing a greatly simplified construction.

It will be understood that in addition to the optical lens mentioned above, another unit such as a source of laser light, for example, may be disposed on the bobbin 11, as required for the purpose of recording and playback.

The composite coil assembly 12 is inserted into a gap 16 of a magnetic circuit which comprises a magnet 13 and yokes 14, 15. Specifically, a magnetic field B is formed between the inner yoke 14 and the outer yoke 15, and passes through each coil of the assembly 12 in a direction substantially perpendicular to the center axis X of the assembly 12 or the bobbin 11.

A combination of spacers 17 and leaf spring 18 is used to locate the assembly 12 at a given position within the gap 16. Specifically, the bobbin 11 includes a shoulder 11c, to which one end 18a of the leaf spring 18 is connected, the other end 18b of which is connected to the outer yoke 15. The spacers 17 are disposed so as to locate the assembly 12 as described within the gap 16. Hence, the spacers 17 may be dispensed with for certain constructions of the bobbin 11 or yokes 14, 15. In this manner, the combination of the bobbin 11, the assembly 12 and the optical lens 10 is capable of movement in the vertical and in the lateral direction in an integral manner.

It will be noted from FIG. 1(b) that the bobbin 11, the assembly and the yokes 14, 15 are pipe-shaped having rectangular cross sections, but it will be understood that they may be cylindrical in configuration.

Figures 2A, 2B:
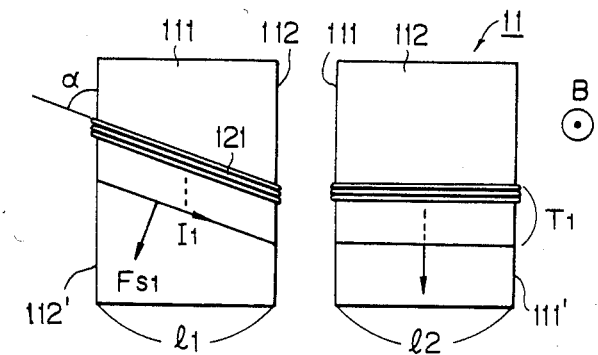
FIG. 2, consisting of 2(a) and 2(b), is an illustration of the manner of winding of a first coil in the embodiment shown in FIG. 1, also indicating the resulting drive to the bobbin.

The composite coil assembly 12 is formed in a manner illustrated in FIGS. 2 and 3. For the convenience of description, it is assumed that the bobbin 11 includes one side surface 111 which adjoins with another side surface 112 on one side thereof, and these surfaces are opposed by other surfaces 111' and 112', respectively. A first coil 121 is wound across the surface 111 for a width $T_1$, in a manner so as to descend to the right, when surface 111 is viewed from the front, as indicated in FIG. 2(a). The angle of inclination is represented by $\alpha$ with respect to the vertical of the bobbin 11. As shown in FIG. 2(b), the lower end of the coil 121 appears on the surface 112, and the coil then extends across the surface 111' in a similar manner as on the surface 111, although it ascends to the right, when the surface 111' is viewed from the front. The upper end of the coil 121 then appears on the surface 112'.

Figures 3A, 3B:
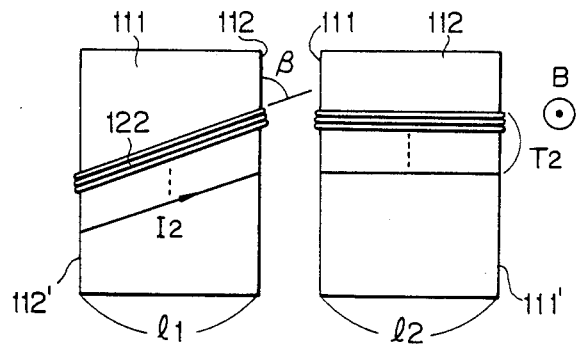
FIG. 3, consisting of 3(a) and 3(b), is an illustration of the manner in which a second coil used in the embodiment of FIG. 1 is disposed, also indicating the resulting drive applied to the bobbin.

Similarly, a second coil 112 is wound for a width $T_2$, but in a manner so as to ascend to the right, when the surface 111 is viewed from the front, as indicated in FIG. 3(a). The angle of inclination is represented by $\beta$ with respect to the vertical of the bobbin 11. The upper end of the coil 122 appears on the surface 112, as shown in FIG. 3(b). The coil then ascends to the right, across the surface 111', when the surface 111' is viewed from the front, and the lower end of the coil 122 then appears on the surface 112'.

Figure 4:
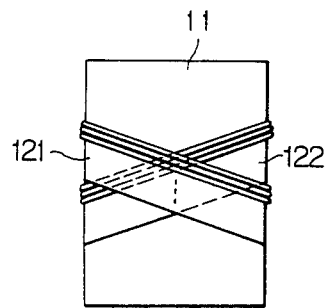
FIG. 4 is an illustration of a composite coil assembly used in the embodiment of FIG. 1.

In this manner, the first and the second coil 121, 122 are disposed on the same bobbin 11. As are result, considering the surface 111, the composite coil assembly appears as shown in FIG. 4.

In operation, it is initially assumed that the magnetic line of force of the field B, FIG. 1(a), is directed toward the viewer in a direction perpendicular to the plane of the drawings, as viewed in FIGS. 2 and 3. It is to be understood that the character B is also used to denote the magnitude of flux density in the gap. When a current $I_1$ is passed through the first coil 121 as shown by an arrow in FIG. 2, the force $F_{s1}$ to which the angularly disposed portion of the coil is subjected is indicated as follows:

$$F_{s1} = \frac{2BNT_1 l_1}{\sin\alpha} I_1 \qquad (1)$$

where N represents the number of turns of the coil per unit length thereof in the vertical direction. The direction of the force $F_{s1}$ is indicated by an arrow in FIG. 2. Accordingly, horizontal component $F_h$ and vertical component $F_{p1}$ can be derived as follows:

$$F_h = 2BNT_1 l_1 \cot\alpha I_1 \qquad (2)$$

$$E_{p1} = 2BNT_1 l_1 I_1 \qquad (3)$$

The force $F_{s2}$ to which the horizontal coil portion is subject is directed as directed by an arrow, and can be expressed as follows:

$$F_{s2} = 2BNT_1 l_1 I_1 \qquad (4)$$

In this instance, there is no horizontal component, and hence the vertical component $F_{p2}$ is equal to $F_{s2}$.

From the equations (2), (3) and (4), it follows that the horizontal component $F_{H1}$ and the vertical component $F_{P1}$ of the force to which the coil 121 is subject are derived as follows:

$$F_{H1} = F_h = K_1 I_1 \qquad (5)$$

$$F_{P1} = F_{p1} + F_{p2} = K_0 I_1 \qquad (6)$$

where $2BNT_1 l_1 \cot\alpha \equiv K_1$ and $2BNT_1(l_1+l_2) \equiv K_0$.

Similarly when a current $I_2$ is passed through the second coil 122 in a direction indicated by an arrow in FIG. 3, the horizontal component $F_{H2}$ and the vertical component $F_{P2}$ of the force of which the coil 122 is subject can be determined as a resultant of forces applied to the various portions thereof, as follows:

$$F_{H2} = K_1 I_2 \quad (7)$$

$$F_{P2} = K_0 I_2 \quad (8)$$

where it is assumed that $\alpha = \beta$ and $T_1 = T_2$.

Consequently, the total force to which the bobbin 11 is subjected can be determined as a resultant of the equations (5) to (8). Assuming that the current flow illustrated in FIGS. 2 and 3 is in the positive direction and that a horizontal force is positive when it is directed to the right while a vertical force is positive when it is directed downward, the total force to which the bobbin 11 is subject has a horizontal component $f_H$ and a vertical component $f_P$, which are given as follows:

$$f_H = K_1(I_2 - I_1) \quad (9)$$

$$f_P = K_0(I_1 + I_2) \quad (10)$$

It will be apparent from the equations (9) and (10) that when it is desired to move the bobbin only in the horizontal direction, currents which are equal in magnitude and opposite in direction or polarity may be passed through the individual coils 121, 122 (or $I_1 = -I_2$). Conversely, when it is desired to move the bobbin 11 only in the vertical direction, currents of an equal magnitude and polarity ($I_1 = I_2$) may be passed through the coils 121, 122. It should be understood that currents of different magnitudes may be passed through these coils when it is desired to move the bobbin in both directions while both of the currents may be made equal to zero when it is unnecessary to move the bobbin.

Figure 5:
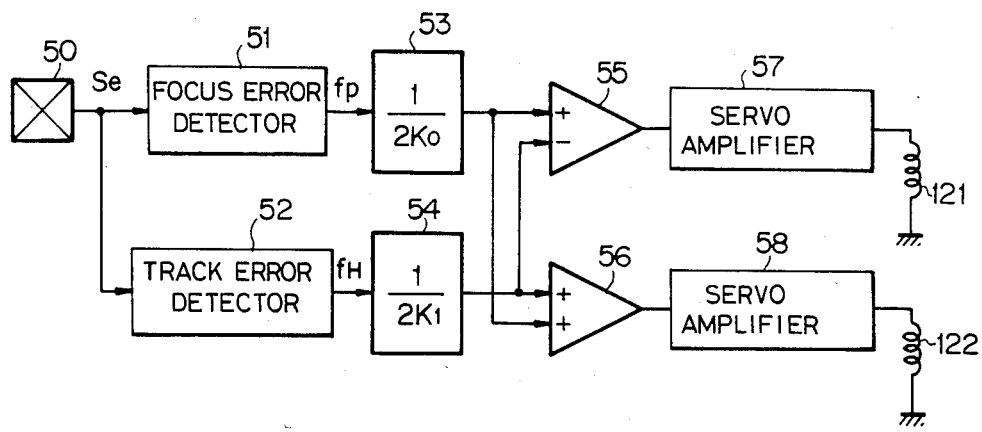
FIG. 5 is a block diagram illustrating one form of drive circuit which may be used in the embodiment of FIG. 1 to drive the composite coil assembly.

FIG. 5 shows a drive circuit which operates to achieve such a movement of the bobbin. Specifically, the circuit includes an error sensor 50, a focus error detector 51, a track error detector 52, amplifiers 53, 54, a subtractor 55, a summer 56, servo amplifiers 57, 58 and coils 121, 122. In response to a signal Se supplied from the sensor 50, the respective detectors 51, 52 determine the magnitude of the component forces $f_P$ and $f_H$ with which the coils 121 and 122 (and accordingly the optical lens 10) should be driven.

From the equations (9) and (10), we have:

$$I_1 = \frac{1}{2}\left(\frac{f_P}{K_0} - \frac{f_H}{K_1}\right) \quad (11)$$

$$I_2 = \frac{1}{2}\left(\frac{f_P}{K_0} + \frac{f_H}{K_1}\right) \quad (12)$$

Hence the amplifiers 53, 54 have amplification factors of $\frac{1}{2}K_0$ and $\frac{1}{2}K_1$, respectively, and the subtractor 55 and the summer 56 provides the desired magnitude of currents as represented by the above equations. In actuality, it is desirable that a stabilizing circuit as may be formed by a differentiator and/or phase compensation circuit be inserted after the respective detectors 51, 52.

Figure 6B:
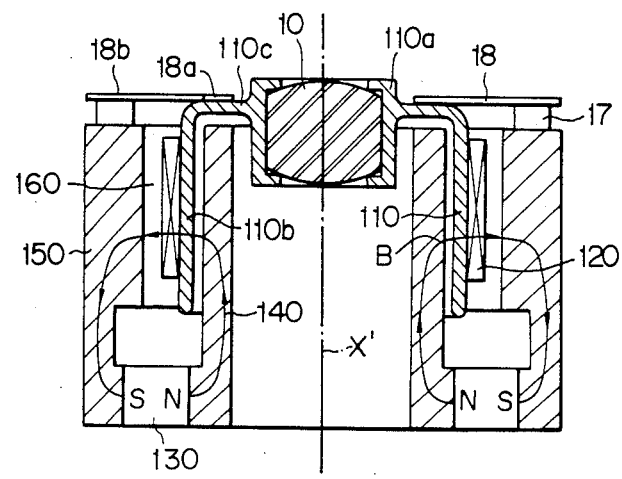
FIG. 6(b) being a schematic cross section.

FIG. 6 shows a second embodiment of the invention. In the second embodiment as well as a third embodiment to be described later, the composite coil assembly includes three coils for performing time axis control in addition to focus control and tracking control. To avoid complication, the optical lens, the spacers, the leaf springs and the magnetic field are designated by like reference characters as used in FIG. 1.

Figure 6A:
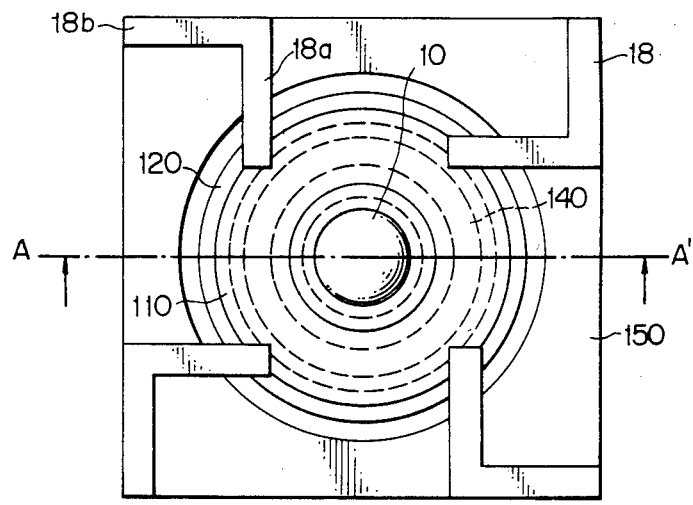
FIG. 6(a) being a schematic top view.

In the second embodiment, a bobbin 110 includes a portion 110b on which coils are disposed and which is in the form of a hollow cylinder as indicated in FIG. 6(a). A magnetic circuit 150 has a gap 160 of a corresponding configuration. The optical lens 10 is supported by a section 110a of the bobbin 110, which is formed at one end thereof. The bobbin also includes a cylindrical section 110b which is concentric with the section 110a and on which a composite coil assembly 120 including three coils is disposed.

The assembly 120 is inserted into the gap 160 of a magnetic circuit which comprises a magnet 130 and yokes 140, 150. A magnetic field B is formed between the inner yoke 140 and the outer yoke 150, and passes through the assembly 120 in a direction which is substantially perpendicular to the center axis X' of the assembly 120 or the bobbin 110.

The assembly 120 is disposed at a given position within the gap 160 by means of the spacers 17 and the leaf springs 18. Specifically, the bobbin 110 includes a shoulder 110c, to which one end 18a of the leaf spring 18 is connected, the other end 18b of which is connected to the spacer 17 which is located on top of the outer yoke 15. The spacer 17 can be dispensed with for certain constructions of the bobbin 110 or yokes 140, 150. In this manner, the bobbin 110, the assembly 120 and the optical lens 10 are capable of integral movement in the vertical and in the lateral direction.

Figure 7:
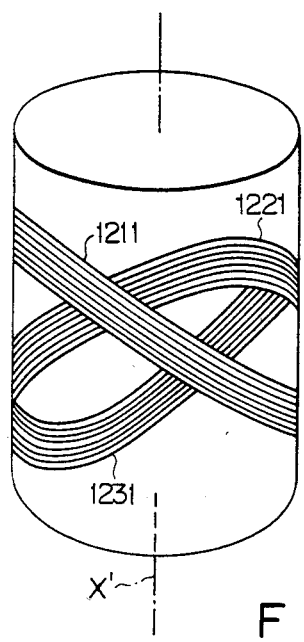
FIG. 7 is a perspective view illustrating the manner of disposing a first, a second and a third coil used in the second embodiment.

FIG. 7 shows the manner of winding three coils 1211, 1221, 1231 which form together the assembly 120. Specifically, the first coil 1121 is wound at a given angle with respect to the vertical of the bobbin 110 or the center axis X' thereof in a manner to descend to the right, when a certain peripheral region of the bobbin 110 is viewed. Similarly, the second and the third coil 1221, 1231 are disposed at given angles with respect to the center axis X' of the bobbin 110, but are phase-displaced from each other, when viewed in the direction of rotation about the center axis X'. It should be noted that the phase displacement between these coils need not be equal to each other. Also, the angle of inclination of the individual coils need not be equal to each other.

It will be understood that by controlling the current passed through the coils 1211, 1221 and 1231, the bobbin, and hence the optical lens carried thereby, may be controlled in the X direction as well as in two other directions which are orthogonal thereto, thus achieving a focus control, a tracking control and a time axis control.

Figure 8:
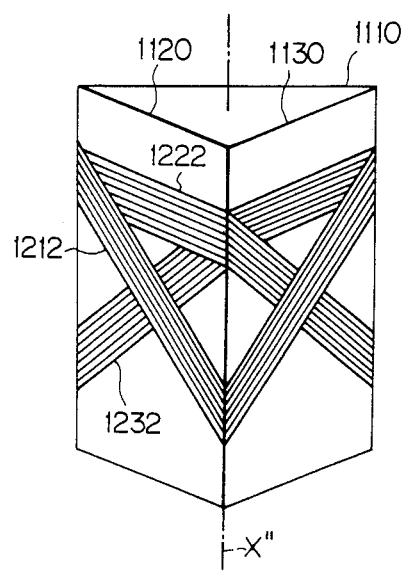
FIG. 8 is a schematic perspective view of a hollow triangular pillar, used as a bobbin portion on which three coils are disposed, in a third embodiment of the invention.

FIG. 8 shows a bobbin having a portion on which coils are disposed and which is in the form of a hollow triangle pillar, which represents a third embodiment of the invention. It should be understood that a gap in the associated magnetic circuit is shaped in a manner corresponding to such bobbin section.

Considering this embodiment, the magnetic field passing through the composite coil assembly may be denoted by the character B as before, which also represents the flux density. It is also assumed that the magnetic field B is perpendicular to individual surfaces 1110, 1120, 1130 of the bobbin, and is directed from the outside to the inside thereof.

Figure 9A:
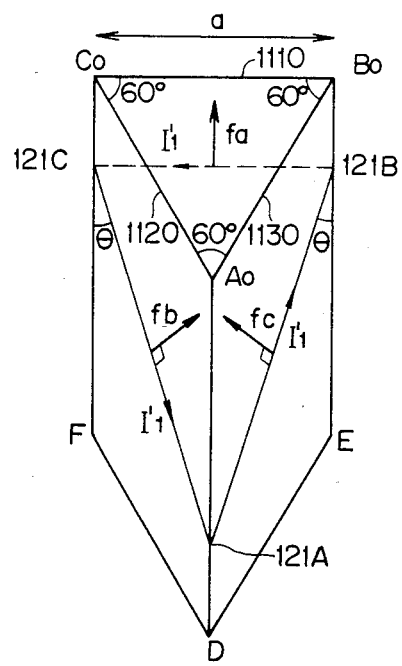
FIG. 9, consisting of 9(a)–9(d), is a series of diagrams illustrating the drive applied to the bobbin in the third embodiment.

When a current $I_1'$ is passed through a first coil 1212 in a direction indicated by an arrow in FIG. 9, forces $f_a$, $f_b$, $f_c$ which the individual portions of the coil 1212 will be subject to are represented as follows:

$$f_a = NBI_1'a$$

$$f_b = f_c = NBI_1' \cdot \frac{a}{\sin \theta}$$

where N represents the number of turns in the coil 1212 and $\theta$ the angle formed between the coil 1212 and the axis X''. The direction of these forces will be normal to the direction of current flow as indicated in FIG. 9(a), according to the left-hand rule of Flemming. As will be evident from FIG. 9(b), the vertical force $F'_{p1}$ applied to the bobbin 110 as a result of these force components $f_a$, $f_b$, $f_c$ is given as follows:

$$F_{p1} = f_a + f_b \sin \theta + f_c \sin \theta \quad (13)$$
$$= 3NBI_1'a$$

Figure 9B:
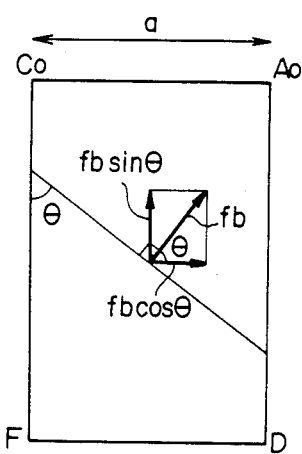
Figure 9C:
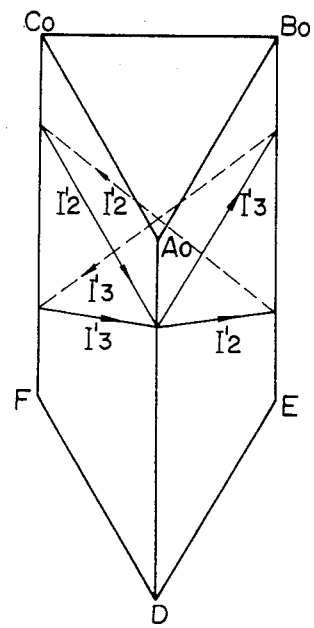
Figure 9C:
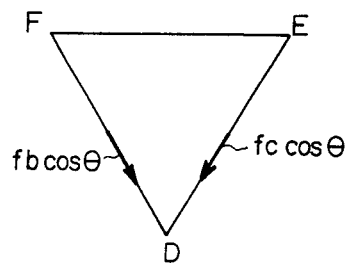

The horizontal force $F_{q1}$ applied to the bobbin 110 is a resultant of $f_b \cos \theta$ and $f_c \cos \theta$, as will be evident from FIG. 9(b), and hence is expressed as follows:

$$F_{q1} = \sqrt{3} NBI_1 a \cdot \cot \theta \quad (14)$$

Vertical forces $F_{p2}'$, $F_{p3}'$ and horizontal forces $F_{q2}'$, $F_{q3}'$ which are produced by the other coils 1222, 1232 are similarly derived. Assuming that the coils 1222 and 1232 have the same number of turns N as the coil 1212 and form an angle of $\theta$ with the axis X'', with currents $I_2'$, $I_3'$ being passed therethrough, we have:

$$F_{p2} = 3NBI_2'a \quad (15)$$

$$F_{p3} = 3NBI_3'a \quad (16)$$

$$F_{q2} = \sqrt{3} NBI_2'a \cdot \cot \theta \quad (17)$$

$$F_{q3} = \sqrt{3} NBI_3'a \cdot \cot \theta \quad (18)$$

Accordingly, the vertical force $F_p$ is derived from the equations (13), (15) and (16), as follows:

$$F_p = 3NBa(I_1' + I_2' + I_3') \quad (19)$$

Figure 9D:
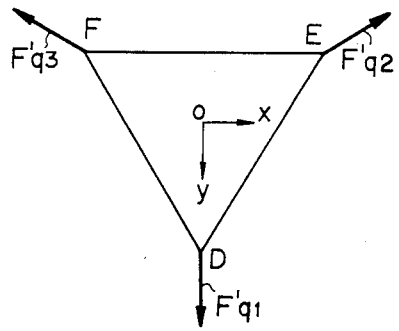

On the other hand, the horizontal force can be derived as a resultant of $F_{q1}'$, $F_{q2}'$ and $F_{q3}'$, as will be evident from FIG. 9(d). Its components $F_x$ and $F_y$ can be derived, from the equations (14), (17) and (18), as follows:

$$F_x = F_{q2} \cos 30° - F_{q3} \cos 30° \quad (20)$$
$$= \frac{3}{2} NBa \cdot \cot \theta (I'_2 - I'_3)$$

$$F_y = F_{q1} - F_{q2} \sin 30° - F_{q3} \sin 30° \quad (21)$$
$$= \sqrt{3} NBa \cdot \cot \theta \left( I'_1 - \frac{I'_2}{2} - \frac{I'_3}{2} \right)$$

using the following denotations:

$$3NBa = K_1'$$

$$\frac{3}{2} NBa \cot \theta = K_2'$$

$$\sqrt{3} NBa \cot \theta = K_3'$$

the equations (19), (20) and (21) can be rewritten as follows:

$$\left. \begin{array}{l} F_p = K_1' (I_1' + I_2' + I_3') \\ F_x = K_2' (I_2' - I_3') \\ F_y = K_3' \left( I_1' - \frac{I_2'}{2} - \frac{I_3'}{3} \right) \end{array} \right\} \quad (22)$$

Rewriting these equations for $I_1$, $I_2$ and $I_3$, we have:

$$\left. \begin{array}{l} I_1' = \frac{F_p}{3K_1} + \frac{2F_y}{3K_3} \\ I_2' = \frac{F_p}{3K_1} + \frac{F_x}{2K_2} - \frac{F_y}{3K_2} \\ I_3' = \frac{F_p}{3K_1} - \frac{F_x}{2K_2} - \frac{F_y}{3K_3} \end{array} \right\} \quad (23)$$

It will be apparent from the equations (22) that when it is desired to move the bobbin 110 only in the vertical direction, the currents passed through the coils 1212, 1222, 1232 may be chosen such that $I_1' = I_2' = I_3'$. When it is desired to move the bobbin 110 only in the X'' direction, the currents passed through these coils may be chosen such that $I_1' = 0$, and $I_2' = -I_3'$. When it is desired to move the bobbin 110 only in the Y direction, the currents may be chosen such that $I_1' = -2I_2' = 2I_3'$. When no motion of the bobbin is desired, the choice is $I_1' = I_2' = I_3' = 0$.

Figure 10:
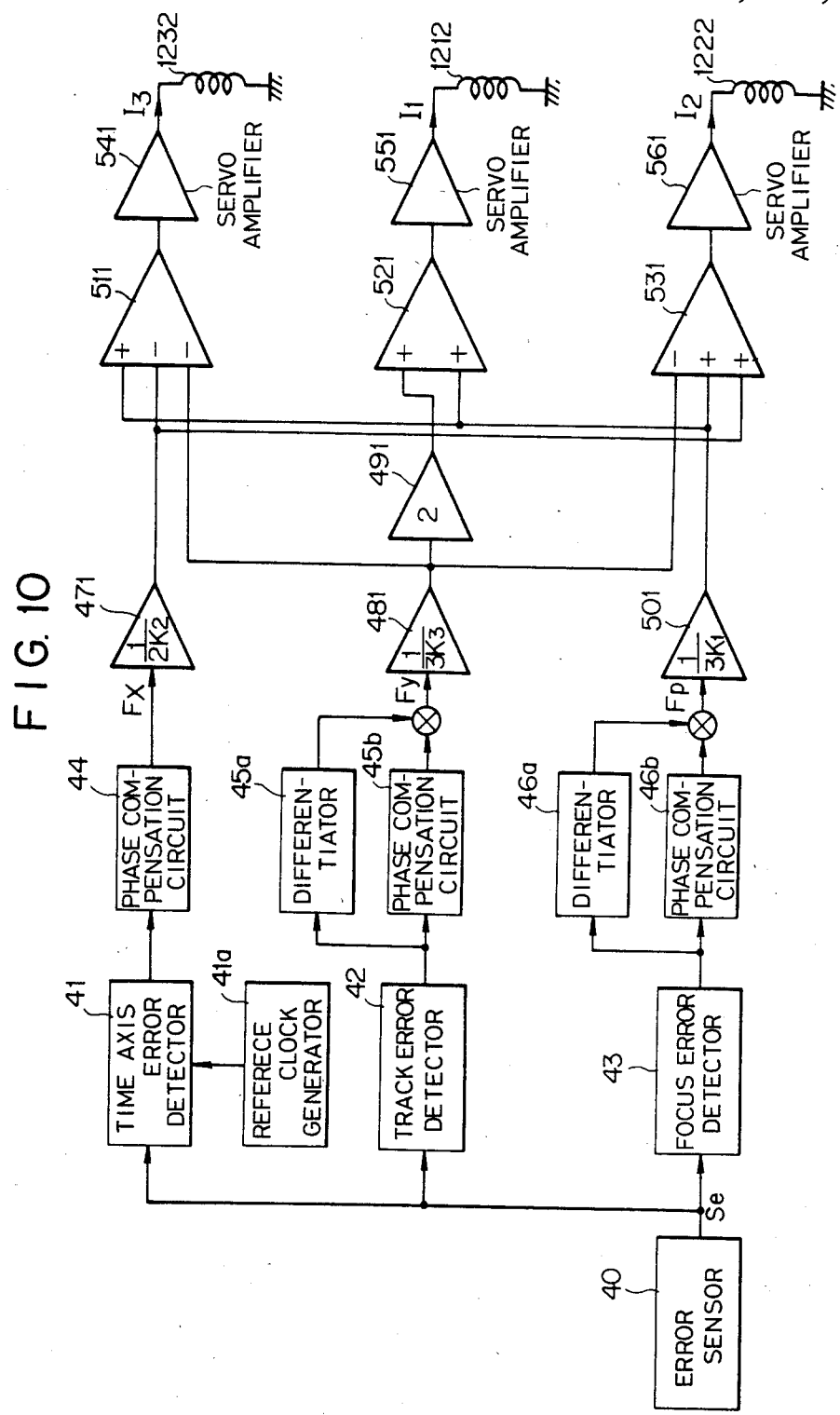
FIG. 10 is a block diagram showing one form of drive circuit which may be used in third embodiment to drive the composite coil assembly.

FIG. 10 shows a drive circuit which operates to achieve such movement of the bobbin. As before, a signal Se produced by the error sensor 40 is supplied to a time axis error detector 41, a track error detector 42 and a focus error detector 43, which determine the magnitudes of the forces $F_x$, $F_y$ and $F_p$ with which the coils 1212, 1222 and 1232 (and hence the lens 10) should be driven. The detector 41 is referenced to a clock produced by a reference clock generator 419. As will be seen, phase compensation circuits 44, 45b, 46b, and differentiator 45a, 46a are provided to stabilize each individual control loop. When the magnitude of $F_x$, $F_y$ and $F_p$ are determined, $I_1'$, $I_2'$ and $I_3'$ are determined in accordance with the equations (23). This is implemented by an arrangement shown in FIG. 10 including amplifiers 471, 481, 491 and 501 and calculation circuits 511, 521 and 531. Outputs from the circuits 511 to 531 are supplied to servo amplifiers 541, 551 and 561, respectively, so as to feed currents $I_3'$, $I_1'$ and $I_2'$ to the coils 1232, 1212 and 1222, respectively, thus driving the lens 10 with a desired force.

It should be understood that the bobbin 110 may support an entire optical system including a light source such as laser diode, rather than supporting the optical lens 10 alone.

What is claimed is:

1. An optical recording and playback unit for use with a disc having information marked on its surface, the unit comprising: an optical lens, a bobbin for supporting at least the optical lens and having a portion on which, a composite coil assembly is disposed, including at least a first coil which is disposed at a first non-perpendicular angle with respect to the center axis of the bobbin and a second coil disposed at a second given angle with respect to the center axis, a magnetic circuit having a gap which defines a magnetic flux passing through the composite coil assembly in a direction substantially perpendicular to the center axis of the bobbin, and means for supporting the bobbin so as to be freely movable within the gap.

2. An optical recording and playback unit according to claim 1 in which the first coil is supplied with a signal which represents a sum of a focus error signal representing a deviation of the focus of the light beam on the surface of the disc and a tracking error signal indicative of the deviation of the light beam from a given track, while the second coil is supplied with a signal which represents a difference between the above control signals.

3. An optical recording and playback unit according to claim 1 or 2 in which the bobbin portion on which coils are disposed is in the form of a hollow rectangular pillar.

4. An optical recording and playback unit according to claim 1 or 2 in which the bobbin portion on which the coils are disposed is in the form of a hollow cylinder.

5. An optical recording and playback unit comprising an optical lens, a bobbin for supporting at least the optical lens and having a portion on which a composite coil assembly is disposed including a first coil which is disposed at a first non-perpendicular angle with respect to the center axis of the bobbin, a second coil disposed at a second angle with respect to the center axis of the bobbin, and a third coil disposed at a third angle with respect to the center axis of the bobbin, a magnetic circuit having a gap which defines a magnetic flux passing through the composite coil assembly in a direction substantially perpendicular to the center axis of the bobbin, and means for supporting the bobbin so as to be freely movable within the gap.

6. An optical recording and playback unit according to claim 5 in which the first, the second and the third coil are supplied with currents, the magnitudes of which are generated in a predetermined manner from a focus error signal indicative of the fact that a beam of light directed onto a surface of the disc is out of focus, a track error signal indicative of the fact that the beam has deviated from a given track, and a time axis error signal indicating a fluctuation in the speed with which the beam scans the track.

7. An optical recording and playback unit according to claim 5 or 6 in which the bobbin portion on which coils are disposed is in the form of a hollow cylinder.

8. An optical recording and playback unit according to claim 5 or 6 in which the bobbin portion on which coils are disposed is in the form of a hollow triangle pillar.

* * * * *